(12) United States Patent
McConkie et al.

(10) Patent No.: US 7,591,349 B2
(45) Date of Patent: Sep. 22, 2009

(54) LIQUID COOLED BRAKE ASSEMBLY

(75) Inventors: Richard Carl McConkie, Troy, MI (US); Brenton Charles Bluhm, Helenville, WI (US); Fergus Hopwood, Houston, TX (US); Stephen Wayne Barr, Monument, NM (US)

(73) Assignee: Warner Electric Technology LLC, Braintree, MA (US)

( * ) Notice: Subject to any disclaimer, the term of this patent is extended or adjusted under 35 U.S.C. 154(b) by 501 days.

(21) Appl. No.: 11/263,399

(22) Filed: Oct. 31, 2005

(65) Prior Publication Data

US 2007/0095621 A1 May 3, 2007

(51) Int. Cl.
F16D 55/02 (2006.01)
(52) U.S. Cl. .................. 188/71.6; 188/73.45; 188/18 A
(58) Field of Classification Search ................. 188/170, 188/106 F, 71.6, 71.7, 18 A, 73.45
See application file for complete search history.

(56) References Cited

U.S. PATENT DOCUMENTS

| | | | |
|---|---|---|---|
| 2,785,781 A | 3/1957 | Johansen | |
| 2,835,357 A | 5/1958 | Kelley et al. | |
| 2,934,177 A | 4/1960 | Kelley et al. | |
| 2,981,376 A | 4/1961 | Zeidler | |
| 3,000,470 A | 9/1961 | Milan | |
| 3,033,319 A | * 5/1962 | Wrigley et al. ............. | 188/18 A |
| 3,559,772 A | 2/1971 | Grombke | |
| 3,572,477 A | 3/1971 | Ewart | |
| 3,633,714 A | 1/1972 | Klaue | |
| 3,862,678 A | 1/1975 | Collins | |
| 3,980,159 A | 9/1976 | Baxendale | |
| 4,285,420 A | 8/1981 | Sekella | |
| 4,296,650 A | 10/1981 | Kalns | |
| 4,398,111 A | 8/1983 | Zuch | |
| 4,470,487 A | 9/1984 | Blatt | |

(Continued)

FOREIGN PATENT DOCUMENTS

DE 734 932 5/1943

(Continued)

OTHER PUBLICATIONS

International Search Report issued in corresponding International Application No. PCT/US2006/041038 (Apr. 4, 2007).

(Continued)

*Primary Examiner*—Xuan Lan Nguyen
(74) *Attorney, Agent, or Firm*—Dykema Gossett PLLC

(57) ABSTRACT

An adjustable fluid cooled brake is provided that integrates the driven shaft and bearings with braking components to form a packaged assembly. The brake includes a driven shaft and two bearings disposed about the driven shaft. The brake further includes a housing disposed about the shaft and friction plates coupled to the housing and driven shaft. One end cap assembly of the brake is coupled to the housing and supports one of the bearings. The end cap assembly includes a pressure plate configured to compress the friction plates. Another end cap assembly is coupled to the housing and supports the other bearing. One of end cap assemblies is spaced from the housing by a spacer that may be adjusted to enable axial movement of the end cap assembly relative to the housing and the corresponding bearing thereby permitting adjustment of the brake.

20 Claims, 2 Drawing Sheets

U.S. PATENT DOCUMENTS

| | | |
|---|---|---|
| 4,566,579 A | 1/1986 | Johnson |
| 4,567,966 A | 2/1986 | Bayliss |
| 4,582,175 A * | 4/1986 | Yanai .................... 188/18 A |
| 4,609,076 A | 9/1986 | Collins et al. |
| 4,815,573 A | 3/1989 | Miyata |
| 5,050,710 A | 9/1991 | Bargfrede |
| 5,076,401 A | 12/1991 | Ta et al. |
| 5,577,581 A | 11/1996 | Eberwein et al. |
| 6,006,869 A * | 12/1999 | Rancourt et al. .......... 188/71.5 |
| 6,029,782 A | 2/2000 | Chojecki et al. |
| 6,386,339 B1 | 5/2002 | Woollams |

FOREIGN PATENT DOCUMENTS

| | | |
|---|---|---|
| DE | 1 216 034 | 5/1966 |
| WO | WO 00/53936 | 9/2000 |
| WO | WO 02/066852 A1 | 8/2002 |

OTHER PUBLICATIONS

Written Opinion issued in corresponding International Application No. PCT/US2006/041038 (Apr. 4, 2007).

* cited by examiner

LIQUID COOLED BRAKE ASSEMBLY

BACKGROUND OF THE INVENTION

1. Field of the Invention

This invention relates to liquid cooled brakes and, more particularly, to a packaged assembly incorporating a driven shaft, bearings and brake components.

2. Discussion of Related Art

Conventional liquid cooled disc brakes are sold as a unit and are subsequently mounted on driven shafts. The driven shafts are supported on bearings that are mounted externally of the brake. This arrangement is disadvantageous because the footprint of the shaft and brake assembly is relatively large. Moreover, the separate assembly creates inefficiencies in packaging and in the assembly operation itself. Conventional brakes also preferably contain some means for adjustment of the brake for wear. This need has made it difficult to integrate conventional brakes with shaft and bearing components.

The inventors herein have recognized a need for a brake that will minimize and/or eliminate one or more of the above-identified deficiencies.

SUMMARY OF THE INVENTION

The present invention provides a brake that integrates a driven shaft and bearings with components of an adjustable brake.

A brake in accordance with the present invention includes a driven shaft disposed about a rotational axis and first and second bearings disposed about the driven shaft. The brake further includes a housing disposed about the driven shaft. A first friction plate is coupled to the driven shaft for rotation therewith and is axially movable relative to the driven shaft. A second friction plate is coupled to the housing and is fixed against rotation relative to the housing. The second friction plate defines a fluid jacket configured for passage of a fluid. The brake further includes a first end cap assembly coupled to the housing and supporting the first bearing. The first end cap assembly includes a pressure plate configured for selective movement in a first axial direction towards the first and second friction plates. The brake further includes a second end cap assembly coupled to the housing and supporting the second bearing and a spacer disposed between the one of the first and second end cap assemblies and the housing. Adjustment of the spacer enables axial movement of the one end cap assembly relative to both the housing and a corresponding one of the first and second bearings.

A brake in accordance with the present invention represents a significant improvement relative to conventional liquid cooled disc brakes. In particular, the inventive brake integrates a driven shaft and bearings with components of a liquid cooled disc brake thereby reducing the footprint of the assembly and making assembly and packaging more efficient. Further, the inventive brake accomplishes these objectives while enabling adjustment of the brake to compensate for wear.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
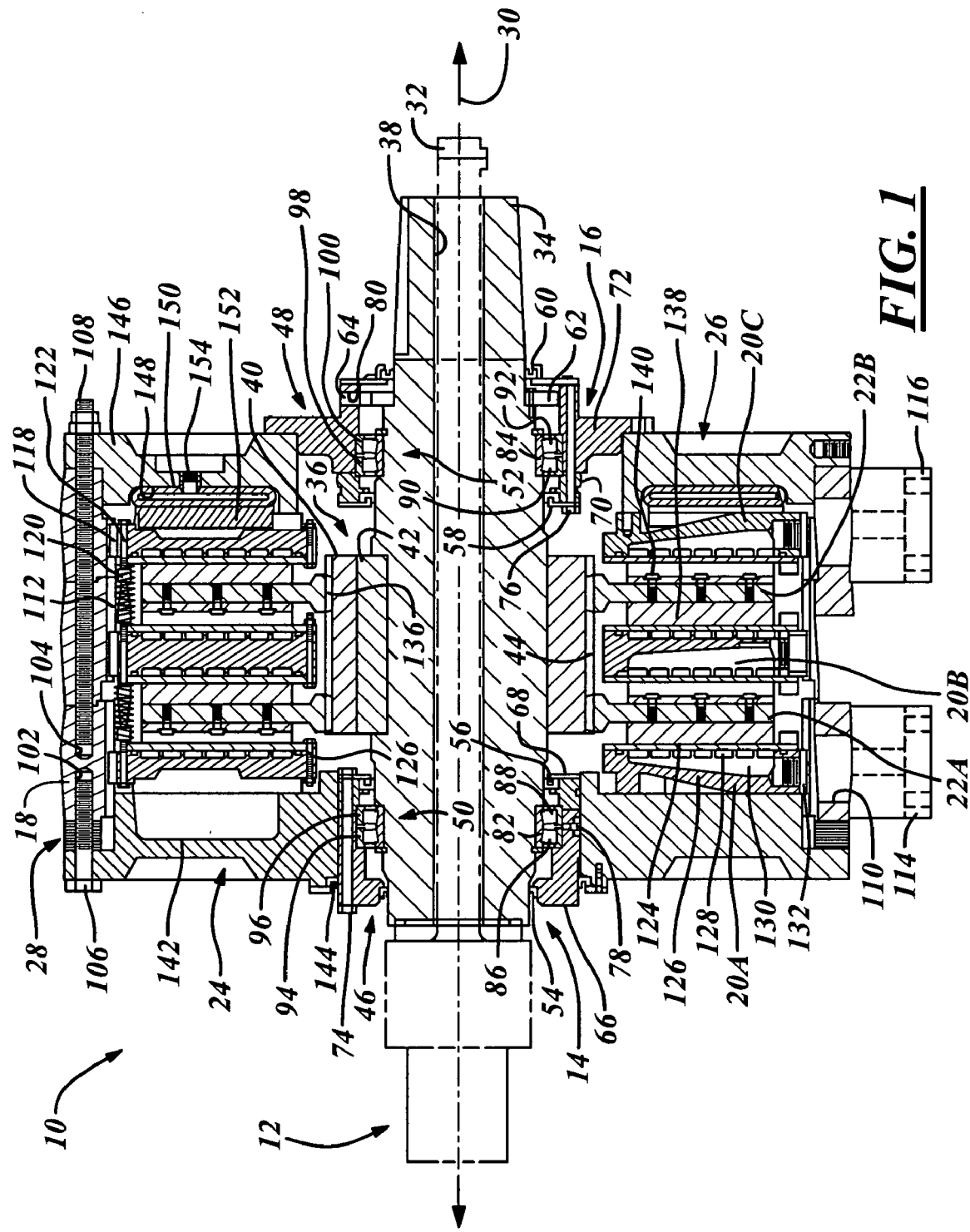
FIG. 1 is a cross-sectional view of a brake in accordance with the present invention.
Figure 2:
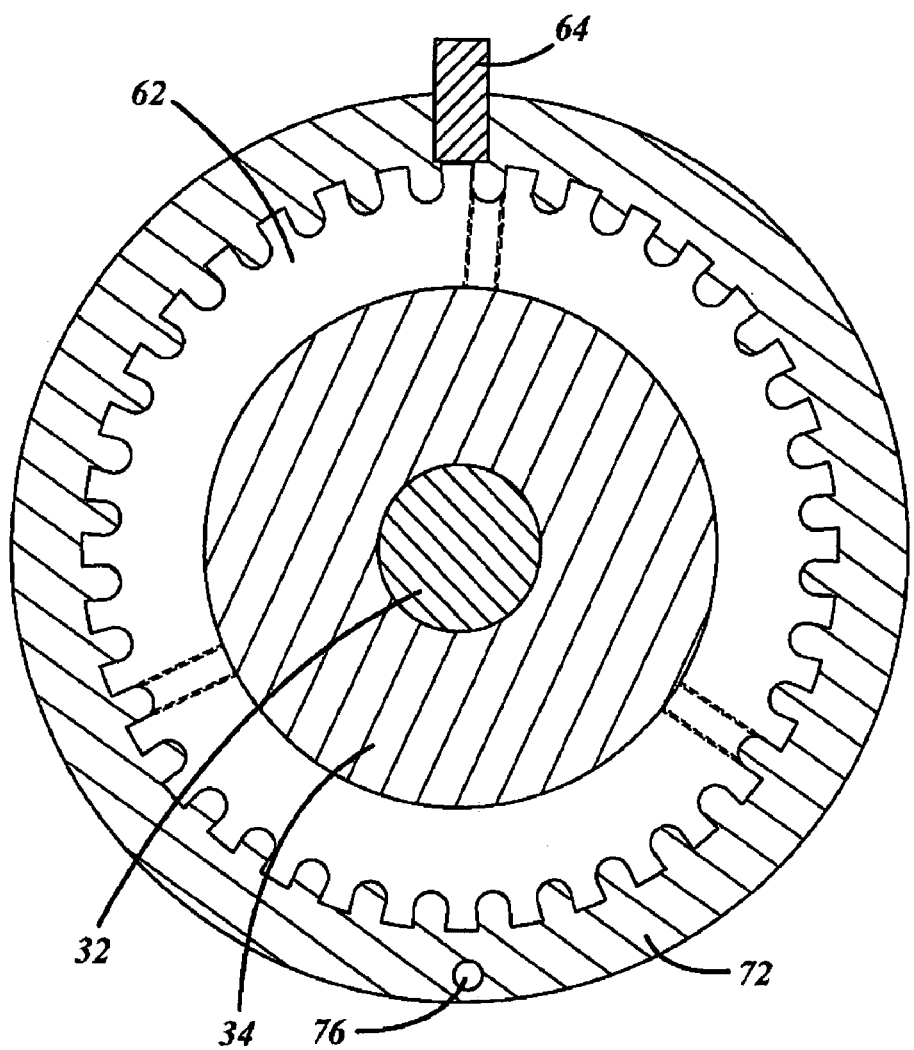
FIG. 2 is a cross-sectional view illustrating a portion of the brake of FIG. 1.

Referring now to the drawings wherein like reference numerals are used to identify identical components in the various views, FIG. 1 illustrates a brake 10 in accordance with the present invention. Brake 10 may be provided for heavy duty industrial use (e.g., on oil drilling equipment). Brake 10 includes a shaft 12, bearing assemblies 14, 16, a housing 18, two sets of friction plates 20A-C, 22A-B, two end cap assemblies 24, 26, and a spacer 28.

Shaft 12 provides torque to a rotatable device (not shown) and is driven a motor (not shown) or other torque generating device. Shaft 12 may be made from conventional metals and metal alloys. Shaft 12 is disposed about a rotational axis 30. Shaft 12 may be a unitary body or, as shown in the illustrated embodiment, shaft 12 may include a plurality of members such as spear 32, inner hub 34 and outer hub 36. Spear 32 is driven by a torque generating device and may be coupled at one end to a draw works shaft (not shown). Spear 32 extends through a bore 38 in inner hub 34 and hub 34 may be coupled to spear 32 through a key/keyway or spline relationship or in other ways customary in the art. Inner hub 34 has an outer diameter that varies along the axial extent of hub 34 to provide a plurality of shoulders and steps used to support outer hub 36 and components of bearing assemblies 14, 16. Outer hub 36 is coupled to inner hub 34. In particular, body 40 of outer hub 36 defines one or more keys 42 configured to be received within corresponding keyway(s) in inner hub 34. Body 40 also has a plurality of spline teeth 44 on a radially outer surface for a purpose described hereinbelow.

Bearing assemblies 14, 16 are provided to allow rotation of shaft 12 relative to components of brake 10. Bearing assembly 14 is disposed between inner hub 34 of shaft 12 and end cap assembly 24. Bearing assembly 16 is disposed between inner hub 34 of shaft 12 and end cap assembly 26. Each bearing assembly 14, 16 includes a bearing carrier 46, 48, a bearing 50, 52, and seals 54, 56 and 58, 60 respectively. Bearing assembly 16 may further includes a body, such as a transducer wheel 62, coupled to shaft 12, and a sensor 64.

Bearing carriers 46, 48 are provided position and support bearings 50, 52. Each of carriers 46, 48 may include inner and outer members 66, 68, and 70, 72, respectively, that are joined together during assembly by fasteners 74, 76, respectively, such as bolts, screws, pins or adhesives. Members 66, 68 define a recess and opposed shoulders configured to receive bearing 50. Similarly, members 70, 72 define a recess and opposed shoulders configured to receive bearing 52. Outer members 66, 72, may each include a lubricant passage (only one of which is shown, in member 66 of carrier 46) in which a zerk 78 is received for introducing lubricants to the respective bearings 50, 52. Member 72 may also define a bore 80 in which sensor 64 may be disposed. End cap assembly 24 supports bearing carrier 46 and bearing 50. As described in greater detail below, end cap assembly 24 is axially movable relative to bearing carrier 46 and bearing 50, sliding along the radially outer surface of bearing carrier 46. End cap assembly 26 supports bearing carrier 48 and bearing 52. Member 72 of bearing carrier 48 defines a shoulder configured to receive end cap assembly 26.

Bearings 50, 52, are provided to allow relative rotation of shaft 12. Bearings 50, 52 are conventional in the art and may comprise spherical roller bearings. Each bearing 50, 52 may include a unitary cone 82, 84, respectively, defining a pair of inner races for two sets of spherical rollers 86, 88 and 90, 92, with a pair of cups 94, 96 and 98, 100 forming outer races for the rollers 86, 88 and 90, 92, respectively. It should be understood, however, that a variety of conventional bearing structures could be employed.

Seals 54, 56 and 58, 60, are provided to retain lubricant for bearings 50, 52, and to prevent entry of dirt and other contaminants. Seals 54, 56 and 58, 60 are conventional in the art and are disposed at either end of bearing carriers 46, 48, with seals 54, 60 disposed between input hub 34 and members 66, 72, of carriers 46, 48, and seals 56, 58, disposed between input hub 34 and members 68, 70, of carriers 46, 48.

Transducer wheel 62 and sensor 64 provide information regarding the rotational position of shaft 12. Wheel 62 and sensor 64 are conventional in the art. Wheel 62 is coupled to input hub 34 of shaft 12 and may consist of a notched wheel surrounding input hub 34 as is known in the art. It should be understood, however, that a variety of different bodies could be used in place of transducer wheel 62 as position indicators. Sensor 64 is configured to generate a signal indicative of a position of wheel 62. Sensor 64 is conventional in the art and may comprise a Hall effect sensor or other conventional sensor. Sensor 64 may be disposed within bore 80 of member 72 of bearing carrier 48 or may be disposed outside of carrier 48. One advantage of the present invention is that wheel 62 and sensor 64 can be integrated into the packaged brake assembly.

Housing 18 provides structural support to the other components of brake 10. Housing 18 may be made from conventional metals, metal alloys and/or plastics. Housing 18 is disposed about shaft 12 and may be centered about the rotational axis 30. Housing 18 may be substantially circular in shape and may be unitary in construction or composed of multiple pieces joined together. Housing 18 defines axially extending bores 102, 104 at either end configured to receive fasteners 106, 108, used to connect end cap assemblies 24, 26, respectively, to housing 18. Housing 18 also defines a plurality of radial openings 110 sized for receipt of hoses and connectors (not shown). Housing 18 includes a plurality of spline teeth 112 on a radially inner surface for a purpose described hereinbelow. One or more mounting brackets 114, 116, or feet, may extend from housing 18 to allow brake 10 to be mounted to a surface extending substantially parallel to axis 30.

Friction plates 20A-C are provided to transmit a braking torque to friction plates 22A-B and to shaft 12 upon engagement of plates 20A-C, 22A-B. Friction plates 20A-C may include a plurality of spline teeth 118 disposed on radially outer surfaces of plates 20A-C that are configured to mate with teeth 112 of housing 18 thereby preventing relative rotation of plates 20A-C relative to housing 18, but allowing axial movement of plates 20A-C relative to housing 18. Friction plates 20A-C may be biased apart by springs 120 that are disposed between each pair of plates 20A-C and are disposed about pins 122 extending through plates 20A-C. Although three friction plates 20A-C are shown in the illustrated embodiment, it should be understood that the number of friction plates can be varied to vary braking torque. Each of friction plates 20A-C includes one or more plates 124 and a fluid jacket 126.

Plates 124 are conventional in the art and may be made from a variety of conventional metals and metal alloys including iron or copper. Plates 124 may be connected to one or both sides of each fluid jacket 126 using fasteners 128 such as bolts or screws or pins.

Fluid jackets 126 are provided to allow for circulation of a cooling liquid such as water or another conventional liquid within brake 10 to allow for transfer of frictional heat generated within brake 10. Jackets 126 are conventional in the art and include an annular body that defines a fluid manifold through which liquid circulates and which provides a surface on which plates 124 are mounted. Jackets 126 may define a plurality of concentric flow passages 128 and radial flow passages 130 that place concentric passages 128 in fluid communication with fluid inlets 132 and outlets (not shown).

Friction plates 22A-B are provided to transfer braking torque from friction plates 20A-C to shaft 12. Friction plates 22A-B may be made from conventional metals and metal alloys such as iron and copper. Plates 22A-B include a plurality of spline teeth 136 at a radially inner surface that are configured to engage with teeth 44 on hub 36 of shaft 12 to couple friction plates 22A-B to shaft 12. Plates 22A-B may include a conventional friction material 138 connected to each side of plate 22A-B by fasteners 140 such as bolts or screws. Again, although only two plates 22A-B are shown in the illustrated embodiment, it should be understood that the number of plates 22 can be varied to vary braking torque.

End cap assembly 24 closes one end of housing 18 and provides a fixed surface against which friction plates 20A-C, 22A-B are selectively urged to provide braking torque to shaft 12. Assembly 24 includes an end plate 142 that is annular in construction. Plate 142 is fastened to housing 18 by fasteners 106 Plate 142 also supports bearing 50. In particular, plate 142 is sized to receive bearing carrier 46 of bearing assembly 14. As discussed hereinbelow, plate 142 may be adjusted axially relative to bearing 50 and bearing carrier 46 in accordance with one aspect of the present invention. A seal 144 may be disposed between plate 142 and bearing carrier 46 on an outboard side of plate 142 to prevent dirt and other contaminants from entering brake 10.

End cap assembly 26 closes an opposite axial end of housing 18 and provides support for a brake actuator. In the illustrated embodiment, end cap assembly 26 includes a plate 146 that is annular in construction and which is fastened to housing 18 using one or more fasteners 108. Plate 146 defines an annular recess 148 configured to receive an expandable bladder 150 that bears against a pressure plate 152. Plate 146 also defines an axial bore 154 through which pneumatic or hydraulic fluid is provided to bladder 150 via a hose (not shown). When fluid is supplied to bladder 150, bladder 150 expands and urges pressure plate 152 in an axial direction against the force of springs 120 to compress, and cause engagement of, friction plates 20A-C, 22A-B. When fluid pressure is removed from bladder 150, springs 120 bias friction plates 20A-C, 22A-B apart. Although the illustrated embodiment employs a single actuator acting as a tension brake, it should be understood that various actuators could be employed and that multiple actuators could be used to provide an emergency brake.

Spacer 28 provides means for adjusting an axial position of end cap assembly 24 relative to housing 18 and also to bearing 50. Although spacer 28 is illustrated in FIG. 1 for use in adjusting the axial position of end cap assembly 24 relative to housing 18 and bearing 50, it should be understood that spacer 28 could be employed on the opposite side of brake 10 to allow adjustment of the axial position of end cap assembly 26 relative to housing 18 and bearing 52. Spacer 28 may comprise one or more shims disposed between end cap assembly 24 and housing 18. The shims may be disposed about the circumference, or a portion of the circumference, of fasteners 106. In accordance with one embodiment of the present invention, a plurality of spacers—each consisting of a plurality of shims—are circumferentially spaced from one another between end cap assembly 26 and housing 18 with each spacer or set of shims disposed about two circumferentially adjacent fasteners. Each spacer, or shim in the corresponding set of shims, has a closed circular aperture through which a fastener 106 extends and a U-shaped or other open aperture through which a circumferentially adjacent fastener extends. As the brake wears, one or more shims may be removed by loosening the fastener extending through the closed aperture in each shim (the fastener extending through the open aperture in the shim may remain in place) thereby enabling end plate 142 to be drawn closer to housing 18 and to compensate for wear. Because some fasteners are not removed, end cap assembly 26 and other components do not need to be removed during the adjustment. In accordance with one aspect of the present invention, end cap assembly 24 continues to provide support to bearing 50 while being axially adjustable. End plate 142 moves axially inwardly relative to bearing carrier 46 of bearing assembly 14.

A brake in accordance with the present invention represents a significant improvement relative to conventional brakes. The inventive brake 10 integrates shaft 12 and bearings 50, 52, with components of a liquid cooled disc brake thereby reducing the footprint of the assembly and making assembly and packaging more efficient. Further, the inventive brake 10 accomplishes these objectives while enabling adjustment of the brake to compensate for wear.

While the invention has been shown and described with reference to one or more particular embodiments thereof, it will be understood by those of skill in the art that various changes and modifications can be made without departing from the spirit and scope of the invention.

We claim:

1. A brake, comprising:
a driven shaft disposed about a rotational axis;
first and second bearings disposed about said driven shaft;
a housing disposed about said driven shaft;
a first friction plate coupled to said driven shaft for rotation therewith and axially movable relative to said driven shaft;
a second friction plate coupled to said housing and fixed against rotation relative to said housing, said second friction plate defining a fluid jacket configured for passage of a fluid;
a first end cap assembly coupled to said housing and supporting said first bearing, said first end cap assembly including a pressure plate configured for movement in a first axial direction towards said first and second friction plates;
a second end cap assembly coupled to said housing and supporting said second bearing; and,
a spacer disposed between said housing and one end cap assembly of said first and second end cap assemblies;
wherein adjustment of said spacer enables axial movement of said one end cap assembly relative to said housing and a corresponding one of said first and second bearings.

2. The brake of claim 1 wherein said second friction plate is axially movable relative to said housing.

3. The brake of claim 1, further comprising a third friction plate coupled to said driven shaft for rotation therewith and axially movable relative to said driven shaft.

4. The brake of claim 1, further comprising a third friction plate coupled to said housing and fixed against rotation relative to said housing, said third friction plate defining a fluid jacket configured for passage of said fluid.

5. The brake of claim 4 wherein said third friction plate is axially movable relative to said housing.

6. The brake of claim 1 wherein said first end cap assembly further includes an expandable bladder disposed against said pressure plate.

7. The brake of claim 1 wherein said spacer comprises a plurality of shims.

8. The brake of claim 1 wherein said spacer is disposed about a fastener coupling said one end cap assembly to said housing.

9. The brake of claim 1 wherein said brake further comprises:
a body coupled to said driven shaft; and,
a sensor configured to generate a signal indicative of a position of said body.

10. The brake of claim 1 wherein said one end cap assembly comprises said second end cap assembly.

11. A brake, comprising:
a driven shaft disposed about a rotational axis;
first and second bearings disposed about said driven shaft;
a housing disposed about said driven shaft;
a first friction plate coupled to said driven shaft for rotation therewith and axially movable relative to said driven shaft;
a second friction plate coupled to said housing and fixed against rotation relative to said housing, said second friction plate defining a fluid jacket configured for passage of a fluid;
a first end cap assembly coupled to said housing and supporting said first bearing, said first end cap assembly including a pressure plate configured for movement in a first axial direction towards said first and second friction plates;
a second end cap assembly coupled to said housing and supporting said second bearing; and,
means for adjusting an axial position of one end cap assembly of said first and second end cap assemblies relative to said housing and a corresponding one of said first and second bearings.

12. The brake of claim 11 wherein said second friction plate is axially movable relative to said housing.

13. The brake of claim 11, further comprising a third friction plate coupled to said driven shaft for rotation therewith and axially movable relative to said driven shaft.

14. The brake of claim 11, further comprising a third friction plate coupled to said housing and fixed against rotation relative to said housing, said third friction plate defining a fluid jacket configured for passage of said fluid.

15. The brake of claim 14 wherein said third friction plate is axially movable relative to said housing.

16. The brake of claim 11 wherein said first end cap assembly further includes an expandable bladder disposed against said pressure plate.

17. The brake of claim 11 wherein said adjusting means comprises a plurality of shims.

18. The brake of claim 17 wherein said plurality of shims are disposed about a fastener coupling said one end cap assembly to said housing.

19. The brake of claim 11 wherein said brake further comprises:
a body coupled to said driven shaft; and,
a sensor configured to generate a signal indicative of a position of said body.

20. The brake of claim 11 wherein said one end cap assembly comprises said second end cap assembly.

* * * * *